(12) United States Patent
Ito (10) Patent No.: US 6,332,054 B1
(45) Date of Patent: Dec. 18, 2001

(54) DISPERSION COMPENSATION APPARATUS (75) Inventor: Toshiharu Ito, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/657,838

(22) Filed: Sep. 7, 2000

(30) Foreign Application Priority Data

Sep. 9, 1999 (JP) .................................................. 11-256313

(51) Int. Cl.$^7$ .................................................. G02B 6/02
(52) U.S. Cl. .......................................................... 385/123
(58) Field of Search ......................... 385/123, 1; 359/123

(56) References Cited

U.S. PATENT DOCUMENTS

| | | | |
|---|---|---|---|
| 4,786,172 | * 11/1988 | Zomick | 356/350 |
| 5,877,879 | 3/1999 | Naito | 359/133 |
| 6,023,360 | * 2/2000 | Morioka et al. | 359/123 |
| 6,236,495 | * 5/2001 | Moeller | 359/337 |

FOREIGN PATENT DOCUMENTS

| | | |
|---|---|---|
| 8-248456 | 9/1996 | (JP) . |
| 9-46318 | 2/1997 | (JP) . |

OTHER PUBLICATIONS

Ito et al., "Feasibility study on over 1 bit/s/Hz high spectral effciency WDM with optical duobinary coding and Polarization interleave multiplexing", Technical Digest, pp. 43–45, 1997.

Bergano et al., "320 Gb/s WDM Tansmission (64×5 Gb/s) over 7,200 km using Large Mode Fiber Spans and Chirped Return–to–Zero Signals", Optical Fiber Communication Conference '98, paper PD–12, pp. 1–4, 1998.

Yamashita et al., "Polaization Properties Of A Reflective Fiber Amplifier Employing A Circulator And A Faraday Rotator Mirror", Journal of Lightwave Technology, vol. 14, No. 3, pp. 385–390, 1996 (IEEE/OSA).

Sugizaki et al., "Polarization insensitive broadband transparen DCF module with faraday rotator mirror, Raman Amplified by single polarization diode–laser pumping", Optical Fiber Communication Conference '99, paper TuS5–1, pp. 279–281, 1999.

* cited by examiner

*Primary Examiner*—Frank G. Font
*Assistant Examiner*—Michael P. Mooney
(74) *Attorney, Agent, or Firm*—Foley & Lardner

(57) ABSTRACT

A dispersion compensation apparatus capable of compensating for dispersion while the state of polarization is maintained overall all channels between the input and output ends. Input signal light in alignment with the transmission polarization axis of a polarization beam splitter passes through the multiplexer and a wavelength dispersion-compensating device and is reflected by a Faraday rotator mirror so as to pass through the wavelength dispersion-compensating device again. Owing to the action of the Faraday rotator mirror, the signal light that returns to the wavelength dispersion-compensating device has a polarization that is orthogonal to the polarization that prevailed when the signal light first passed through the device. Thus the polarization beam splitter now operates in the reflective polarization mode with respect to the returning signal light. As a result, 100% of the signal light is output to a Polarization-maintaining optical fiber. Moreover, the polarization is fixed linear polarization.

14 Claims, 6 Drawing Sheets

DISPERSION COMPENSATION APPARATUS

FIELD OF THE INVENTION

This invention relates to a dispersion compensation apparatus and optical transmission apparatus in a fiber optic transmission system which uses wavelength division multiplexing.

BACKGROUND OF THE INVENTION

Long-distance, high-capacity wavelength division multiplexed transmission systems has become possible owing to improvements of erbium-doped fiber optic amplifiers and transmission fiber. Further, the rapid spread of the Internet has led to increased demand for larger communication capacity in long-distance fiber optic transmission lines, and an increase in such capacity is under consideration.

Generally, in fiber optic transmission, it is known that a large accumulation of wavelength dispersion has the effect of accelerating waveform degradation due to non-linear effects. For this reason, when a transmission line is constructed, care is taken to avoid the occurrence of a large accumulation of dispersion to the greatest extent possible. However, in case of wavelength division multiplexed transmission systems, transmission fiber exhibits wavelength dependence on wavelength dispersion (i.e., a higher-order disoersion characteristic) and, as a consequence, the manner in which dispersion accumulates differs for each channel.

The following discussion will be given by way of analyzing the problems encountered in the prior art in the course of investigation toward the present invention.

An example of a case in which a 16-channel 10-Gb/s signal (0.8 nm spacing) is transmitted 6,000 km will be described. An optical fiber for a transmission line is composed of an NZDSF (Non-zero Dispersion-Shifted Fiber) having a dispersion value on the order of −2.0 [ps/nm/km], and a normal fiber having a dispersion value on the order of +17 [ps/nm/km]. Assume that higher-order dispersion values of these fibers are 0.11 [ps/nm2/km] and 0.06 [ps/nm2/km], respectively.

In order to make the average dispersion value zero, the transmission line is constructed at such a fiber ratio that 2 km of normal fiber is used per 17 km of NZDSF. In such case the average higher-order dispersion value will be (0.11*17+ 0.06 *2)/(17+2)=0.105 [ps/nm2/km]. In accordance with this result, a difference in accumulated dispersion equal to about 500 [ps/nm] (=0.8*0.105*6,000 km) is produced between neighboring channels, which are separated by 0.8 nm, after transmission over the distance of 6,000 km. The difference will be 8,000 [ps/nm] between the channels at both ends of the 16 channels. The channels at both ends will sustain a dispersion accumulation of ±4,000 [ps/nm] even in a case where the design is such that the average dispersion value is zero at the center channel.

Thus, with ultra-long-distance transmission, the manner in which dispersion accumulates differs for each channel because of the higher-order dispersion possessed by transmission fiber. A large dispersion accumulates especially at the end channels. Since this large accumulation of dispersion accelerates non-linear waveform degradation, it is a major factor that limits the transmission capacity or transmission distance in long-distance transmission.

Meanwhile, it is known that this non-linear waveform degradation caused by large accumulation of dispersion is highly dependent upon allocation ratio in a case where the accumulated dispersion is compensated for at the sending and receiving ends, and it is also known that waveform degradation is minimized if the accumulated dispersion is compensated for half at the sending end and half at the receiving end.

Here dispersion compensation at the sending end will be referred to as "pre-dispersion compensation" and dispersion compensation at the receiving end will be referred to as "post-dispersion compensation". Allocation of dispersion compensation to the sending and receiving ends is described in detail in the specification of Japanese Patent Kokai Publication JP-A-9-46318.

It is necessary to increase the number of channels in order to raise the total transmission capacity of a transmission system. However, the usable wavelength band is limited by the amplification band of repeater amplifiers. In order to achieve high capacity, therefore, narrowing the wavelength spacing of each of the channels and multiplexing more channels within the limited wavelength band is vital.

Polarization interleave multiplexing is effective as a technique for realizing narrow channel spacing. This is a technique in which multiplexing is performed in such a manner that neighboring channels are always rendered orthogonal to each other in relation to polarized light. If the neighboring channels are orthogonal to each other with respect to polarization, separation can be achieved using polarization even in a case where there is spectrum overlap between the neighboring channels (see Optical Fiber Communication Conference 97, OFC '97 Technical Digest, paper TuJ1, 1997). To accomplish this, transmission experiments adopting the polarization interleave multiplexing in long-distance, high-capacity wavelength multiplex transmission are being conducted (see Optical Fiber Communication Conference '98, paper PD-12, 1998).

In order to carry out the polarization interleave multiplexing, it is required that the state of polarization of the signal light of all channels be fixed up to the wavelength multiplexer. In other words, it is required that all optical components up to the wavelength multiplexer have a polarization-maintaining function.

The particular problem in this case is the aforementioned pre-dispersion compensation. In most cases, dispersion compensation is carried out using optical fiber referred to as dispersion-compensating fiber. Such fiber does not possess the polarization-maintaining function.

A technique through which an optical device not originally having a polarization-maintaining function is provided with this function by using a Faraday rotator mirror is described in S. Yamashita et. al. IEEE/OSA Journal of Lightwave Technology, vol. 14, no. 3, pp. 385–390, March 1996, and in the specification of Japanese Patent Kokai Publication JP-A-8-248456.

Figure 6:
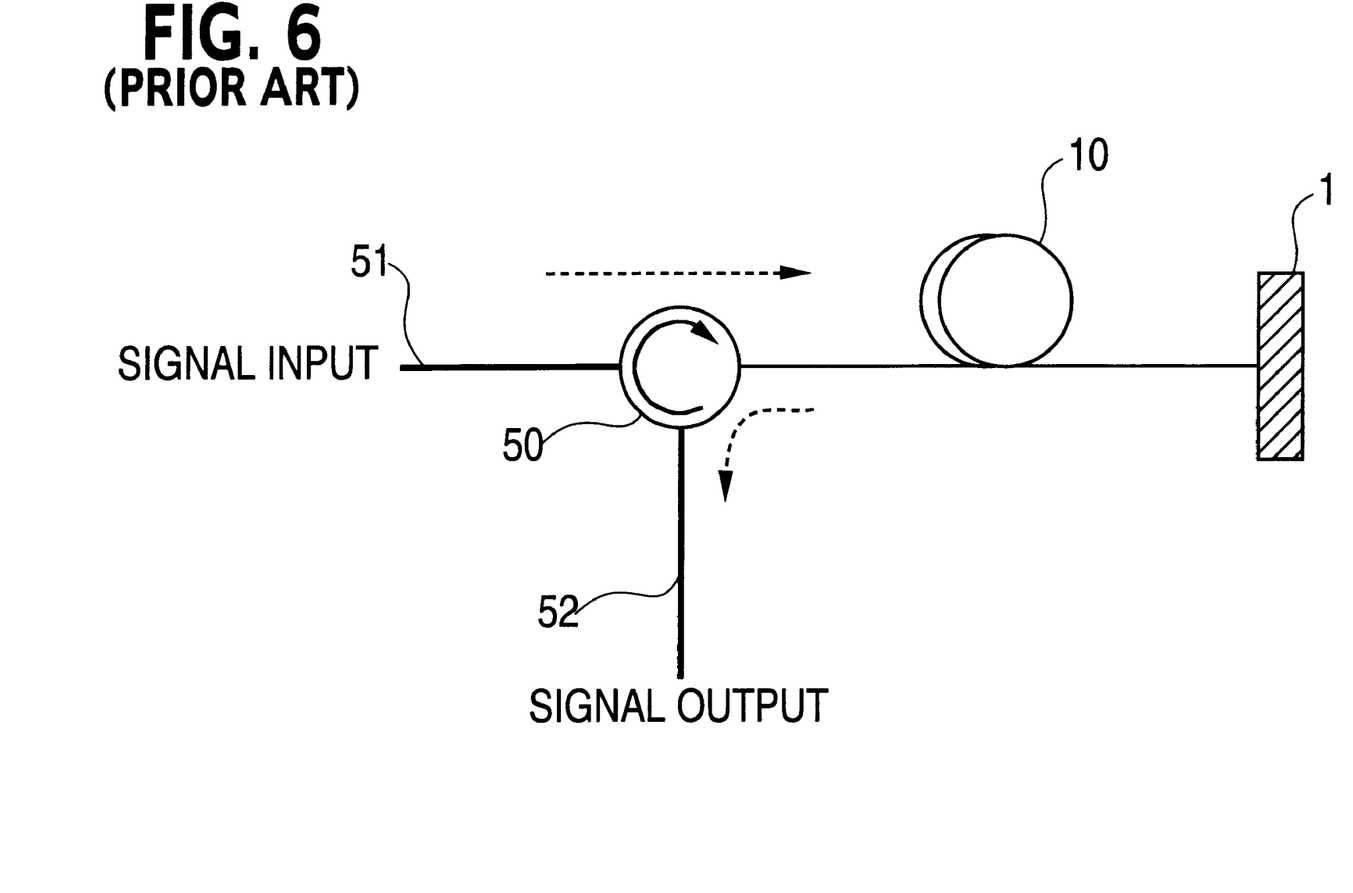
FIG. 6 is a block diagram illustrating the prior art in which use is made of a Faraday rotator mirror and a wavelength dispersion-compensating device.

An example in which this technique is applied to a dispersion compensation apparatus has been reported (see Optical Fiber Communication Conference 99, paper TuS5, 1999). FIG. 6 illustrates a reflecting-type dispersion compensation apparatus using the Faraday rotator mirror, which is described in the aforesaid report, and dispersion-compensating fiber.

As shown in FIG. 6, input signal light applied to an optical circulator 50 from a signal input port 51 passes through a dispersion-compensating fiber 10, is reflected by a Faraday rotator mirror 1 and passes through the dispersion-compensating fiber 10 again. Owing to the effect of the Faraday rotator mirror 1, signal light that has returned to the optical circulator 50 has orthogonal polarization to the signal light input to the signal input port 51. Polarized output light thus made orthogonal to the input signal light is delivered from a signal output port 52 of the optical circulator 50.

SUMMARY OF THE DISCLOSURE

There is much to be desired in the prior art. The following analysis on the prior art will be given specifically for the present invention.

In accordance with the reflecting-type dispersion compensation apparatus shown in FIG. 6 (1) it is possible to reduce the quantity of dispersion-compensating fiber (by causing the signal light to travel back and forth), and (2) it is possible to reduce the influence of polarization mode dispersion in the dispersion-compensating fiber. However, the polarization of the signal light output from the optical circulator 50 is dependent upon the polarization of the input signal light and there is no assurance that all of the polarized light will always be fixed to a particularly defined linearly polarized state of light.

Thus, in order to perform the polarization interleave multiplexing, it is required that polarization be maintained in regard to all channels up to the wavelength multiplexer. To achieve this, a dispersion compensation apparatus having a polarization-maintaining function is necessary. However, the conventional dispersion compensation apparatus does not possess such a function.

Accordingly, an object of the present invention is to provide a dispersion compensation apparatus capable of performing dispersion compensation while the state of polarization between the input and output is maintained.

Another object of the present invention is to provide an arrangement for minimizing the effects of back-scattered light produced in a dispersion-compensating fiber, which is a problem that arises when a dispersion compensation apparatus is provided.

According to a first aspect of the present invention, the foregoing objects are attained by providing a dispersion compensation apparatus for compensating for accumulated dispersion, which causes degradation of signal waveform in fiber optic communication. The apparatus comprises: a first polarization-maintaining optical fiber; a second polarization-maintaining optical fiber; a polarization beam splitter having a first port to which the first polarization-maintaining optical fiber is connected, a second port to which the second polarization-maintaining optical fiber is connected, and a third port orthogonally multiplexing linearly polarized light from the first polarization-maintaining optical fiber to the second polarization-maintaining optical fiber; a wavelength dispersion-compensating device connected to the third port of the polarization beam splitter; and a Faraday rotator mirror connected to the wavelength dispersion-compensating device. Signal light is input to the first port of the polarization beam splitter with a state of polarization of the signal light made to conform to an intrinsic polarization axis of the first polarization-maintaining optical fiber, traverses the wavelength dispersion-compensating device, is reflected by the Faraday rotator mirror, traverses the wavelength dispersion-compensating device again, returns to the third port of the polarization beam splitter and is output to the second polarization-maintaining optical fiber from the second port of the polarization beam splitter.

According to a second aspect of the present invention, there is provided a process for dispersion compensation.

The process comprises:

(a) providing a dispersion compensation apparatus comprising:

(a1) a first polarization-maintaining optical fiber;

(a2) a second polarization-maintaining optical fiber;

(a3) a polarization beam splitter having a first port to which the first polarization-maintaining optical fiber is connected, a second port to which the second polarization-maintaining optical fiber is connected, and a third port orthogonally multiplexing linearly polarized light from the first polarization-maintaining optical fiber to the second polarization-maintaining optical fiber;

(a4) a wavelength dispersion-compensating device connected to the third port of the polarization beam splitter; and (a5) a Faraday rotator mirror connected to the wavelength dispersion-compensating device;

(b) inputting signal light to the first polarization-maintaining optical fiber from the first portion of the polarization beam splitter with a state of polarization of the signal light made to con form to an intrinsic polarization axis of the first polarization-maintaining optical fiber, (c) allowing the signal light to traverse the wavelength dispersion-compensating device, (d) reflecting the light by the Faraday rotator mirror, (e) allowing the light to traverse the wavelength dispersion-compensating device again, (f) returning the light to the third port of the polarization beam splitter, and (g) outputting the light to the second polarization-maintaining optical fiber from the second port of the polarization beam splitter.

PREFERRED EMBODIMENTS

The wavelength dispersion-compensating device preferably is an optical fiber having a positive or negative dispersion value.

An optical amplifier preferably is interposed between the wavelength dispersion-compensating device and the Faraday rotator mirror.

The amplification factor of signal light provided by the optical amplifier preferably is set to be equal to loss sustained when the signal light traverses the wavelength dispersion-compensating device one time.

An optical band-pass filter for passing light having a wavelength in the vicinity of signal-light wavelength preferably is interposed between the polarization beam splitter and wavelength dispersion-compensating device or between the wavelength dispersion-compensating device and the optical amplifier.

The dispersion compensation apparatus preferably is connected in multiple stages and loss in dispersion-compensating fiber contained in each stage is suppressed to less than 6 dB in both directions.

To gain an understanding of the operation of the present invention, described first will be the principle in accordance with which an ordinary dispersion-compensating fiber devoid of a polarization-maintaining function is provided with this function by using a Faraday rotator mirror.

A Faraday rotator mirror is a mirror which functions to reflect input signal light upon rotating the plane of polarization through a right angle. Signal light that has been reflected by the Faraday rotator mirror propagates through the wavelength dispersion-compensating device in a direction opposite that of the initial traversal and with a state of polarization that is orthogonal to that of the initial traversal. Since the "polarization changing action" in the wavelength dispersion-compensating device now is received by the signal light in a state of orthogonal polarization, the polarization changing effect acts in the opposite direction. As a result, the orthogonal relationship of the light is maintained at all points in both directions.

The polarized state of the light that has returned to the polarization beam splitter is such that the polarized light is orthogonal to the axis of polarization that prevailed at transmission through the polarization beam splitter. In other words, polarization of the returning light is in alignment with the reflective axis of polarization. As a consequence, signal light that is 100% reflected is delivered to the output port and the state of polarization is linear polarization that does not change with time.

Operation in a case where the optical amplifier is interposed between the polarization-maintaining optical fiber and the Faraday rotator mirror will now be described.

When light is caused to propagate through optical fiber, a very small proportion of the light travels in a direction opposite the direction of propagation. This is due to reflection at points where connectors are connected or spliced and to an effect referred to as Rayleigh scattering. In a case where dispersion-compensating fiber is used as the wavelength dispersion-compensating device, a small amount of light which propagates in the opposite direction is produced by Rayleigh scattering by the time the signal light arrives at the Faraday rotator mirror.

Since the signal light is reflected by the Faraday rotator mirror and then propagates similarly in the opposite direction, the light produced by Rayleigh scattering is noise light. The amount of light produced by Rayleigh scattering generally is small. However, since the signal light itself also sustains loss commensurate with travel through the dispersion-compensating fiber in two directions, degradation of optical S/N ratio due to Rayleigh scattering of light is not negligible.

Accordingly, an optical amplifier is interposed directly in front of the Faraday rotator mirror in order to reduce the effect of Rayleigh scattering. If this is done, the proportion of original signal light reflected by the Faraday rotator mirror and amplified by the optical amplifier is increased with respect to Rayleigh-scattered light produced while the signal light advances from the polarization beam splitter to the Faraday rotator mirror. Optical S/N ratio is improved as a result.

If the amplification factor of this optical amplifier is made too high, there is an increase in the influence of the Rayleigh-scattered light produced by the time the polarization beam splitter is reached after the signal light is reflected by the Faraday rotator mirror. In a case where the total amplification factor applied when the signal light traverses the optical amplifier in two directions is the same as loss sustained when the signal light traverses the optical amplifier in one direction, the optical S/N ratio is improved to the maximum degree.

Described next will be operation in a case where a desired dispersion compensation is applied by a plurality of polarization-maintaining dispersion compensation apparatus.

Consider a case where −2000 [ps/nm] of dispersion compensation is applied. The amount of dispersion required for the dispersion-compensating fiber in this case is −1,000 [ps/nm]. Loss usually is about 6 dB. In this case, the signal sustains minimum loss of at least about 12 dB between the input and output ends. If the proportion of reflection due to Rayleigh scattering is −30 dB, the optical S/N ratio will be 18 dB.

Now consider performing dispersion compensation of −2,000 [ps/nm] by dividing a −1,000 [ps/nm] dispersion-compensating fiber into two −500 [ps/nm] fibers and connecting two polarization-maintaining dispersion compensation apparatus. If the loss of a −500 [ps/nm] dispersion-compensating fiber is 3 dB, then the loss between the input and output of the polarization-maintaining dispersion compensation apparatus will be 6 dB. If the proportion of reflection due to Rayleigh scattering is −30 dB (in actuality, distance is shortened and, hence, the strength of Rayleigh-scattered light decreases), the optical S/N ratio will be 24 dB.

If the Rayleigh-scattered light produced by one of the two polarization-maintaining dispersion compensation apparatus is added linearly to the Rayleigh-scattered light produced by the other polarization-maintaining dispersion compensation apparatus, the final optical S/N ratio will be 21 dB. In other words, the optical S/N ratio is improved by 3 dB in comparison with a case where dispersion compensation is performed by one polarization-maintaining dispersion compensation apparatus using a −1,000 [ps/nm] dispersion-compensating fiber. Thus, dividing a dispersion-compensating fiber into a plurality of fibers, setting up a plurality of polarization-maintaining dispersion compensation apparatus and connecting these in a plurality of stages is preferred to suppress degradation of the optical S/N ratio due to Rayleigh scattering.

Basically, the greater the number of divisions of the dispersion-compensating fiber, the more the effects of Rayleigh scattering can be suppressed. However, the number of polarization beam splitters and the number of Faraday rotator mirrors increase accordingly, thereby raising overall cost. A preferable guideline, therefore, is to divide the dispersion-compensating fiber such that the loss of the dispersion-compensating fiber will be no more than 6 dB for the traversal in both directions.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIGS. 1 to 5 are block diagrams illustrating first to fifth embodiments of the present invention, respectively.

DETAILED DESCRIPTION OF THE PREFERRED EMBODIMENTS

Preferred embodiments of a dispersion compensation apparatus according to the present invention will now be described with reference to the drawings.

Figure 1:
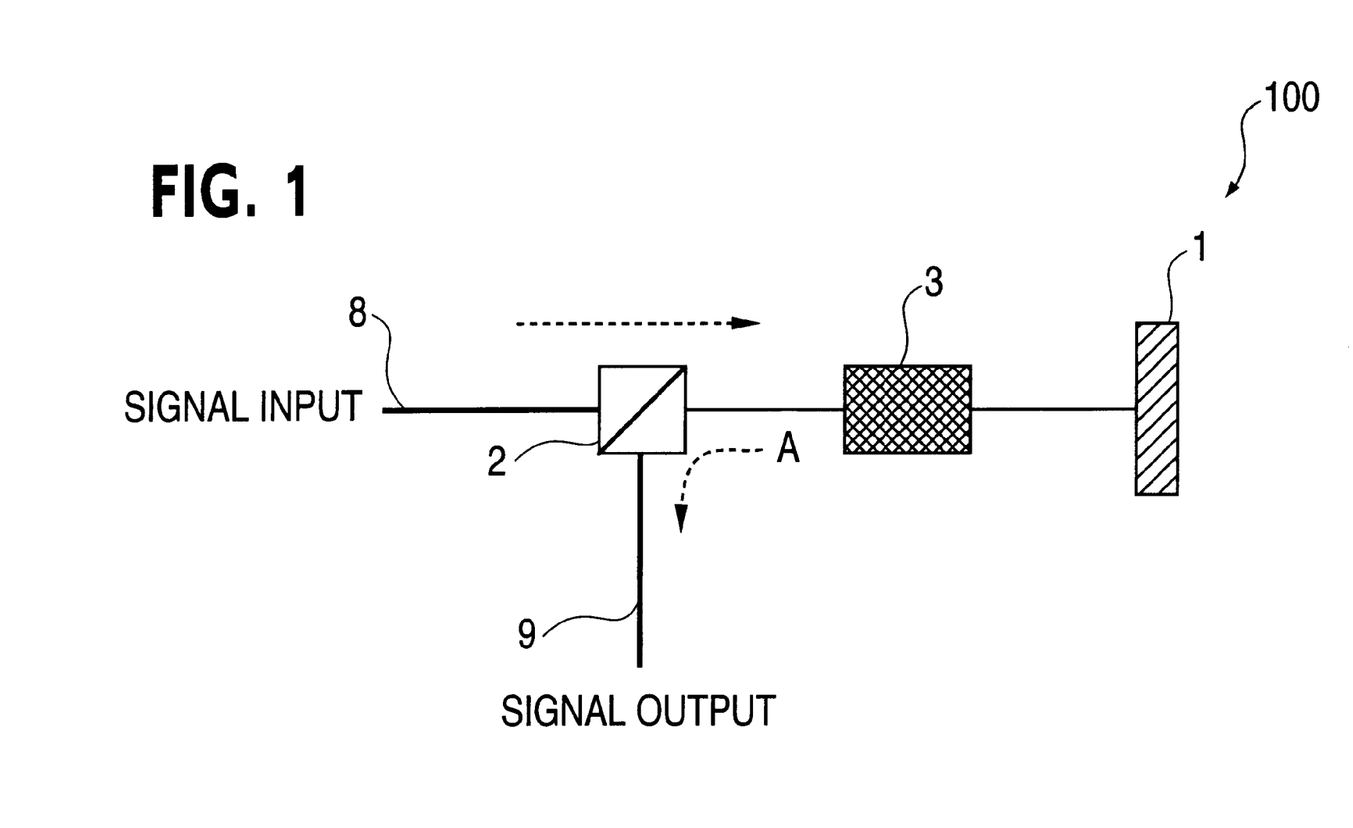

FIG. 1 is a block diagram illustrating a first embodiment of a dispersion compensation apparatus according to the invention.

As shown in FIG. 1, a polarization-maintaining dispersion compensation apparatus 100 includes a Faraday rotator mirror 1, a polarization beam splitter 2 and a wavelength dispersion-compensating device 3. The polarization beam splitter 2 has input and output ports 8, 9, respectively, which are first and second polarization-maintaining optical fibers matched to the intrinsic polarization axes (transmission polarization axis and reflection polarization axis) of the polarization beam splitter. The polarization beam splitter acts as a polarization beam multiplexer.

The input signal light in alignment with the transmission polarization axis of the polarization beam splitter 2 passes through the polarization beam splitter 2 and the wavelength dispersion-compensating device (i.e., wavelength dispersion adding device) 3 and is reflected by the Faraday rotator mirror 1 so as to pass through the wavelength dispersion-compensating device 3 again. Owing to the action of the Faraday rotator mirror 1, the signal light that returns to point A in FIG. 1 has a polarization that is orthogonal to the polarization that prevailed when the signal light first passed the point A. In other words, now the polarization beam splitter 2 operates in the reflective polarization mode with respect to the returning signal light. As a result, 100% of the signal light emerges into the second polarization-maintaining optical fiber 9. Moreover, the polarization is fixed (or coherent) linear polarization.

In this embodiment, there is no distinction between the first and second polarization-maintaining optical fibers. Accordingly, an arrangement may be adopted in which a signal is input from the second polarization-maintaining optical fiber 9 and output from the first polarization-maintaining optical fiber 8.

Figure 2:
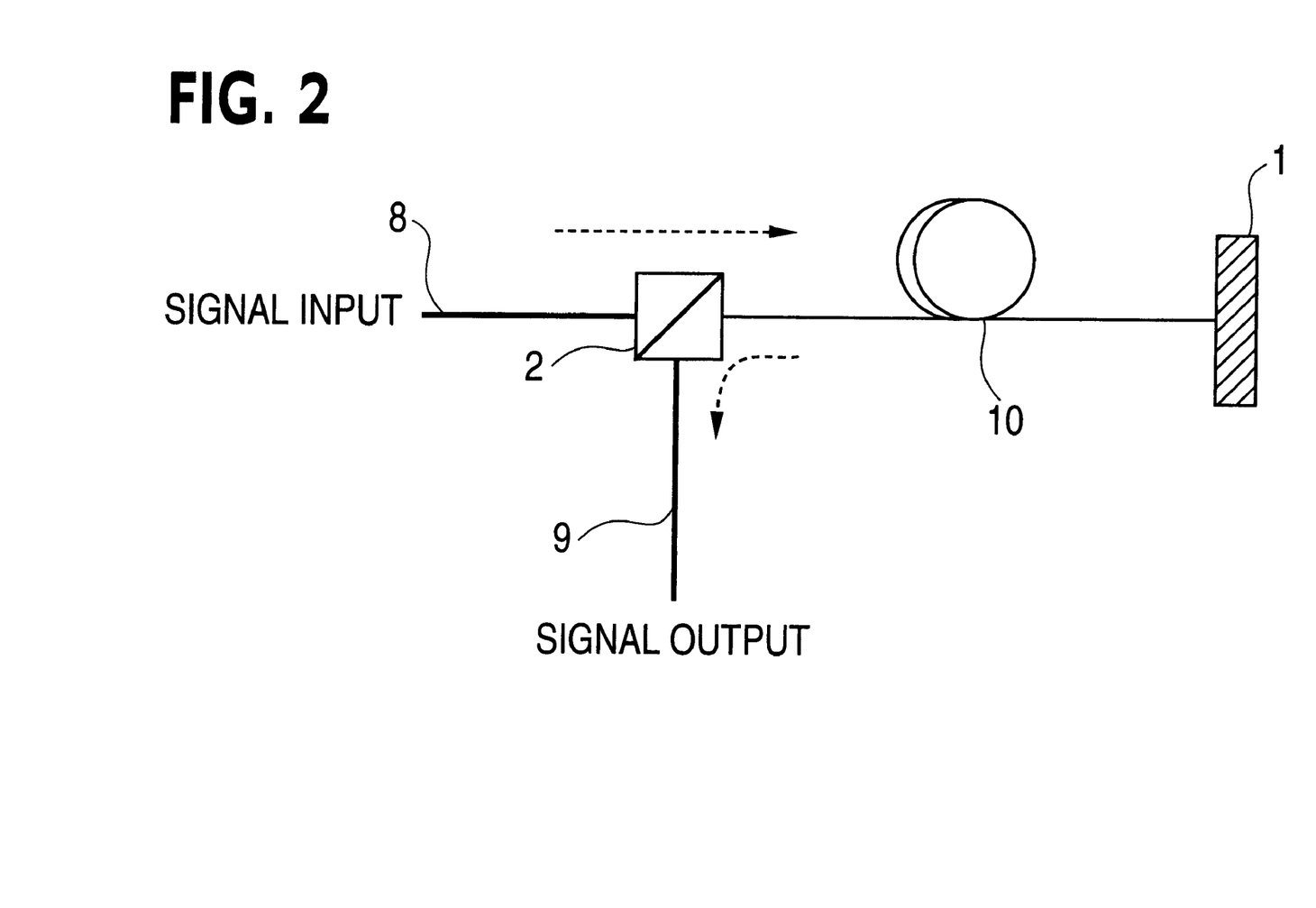

FIG. 2 is a block diagram illustrating a second embodiment. Here the wavelength dispersion-compensating device 3 of the first embodiment is constituted by a dispersion-compensating fiber 10. Operation of this embodiment is similar to that of the first embodiment and the details thereof need not be described again.

Figure 3:
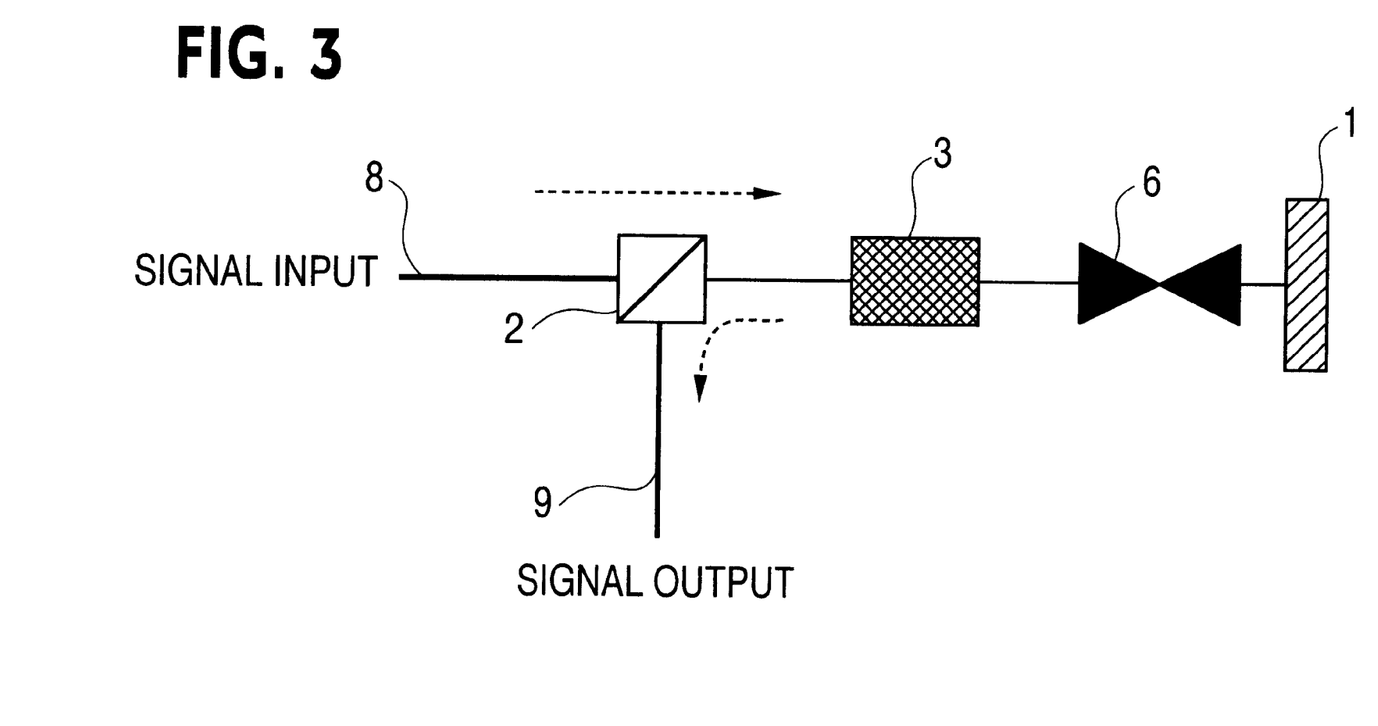

FIG. 3 is a block diagram illustrating a third embodiment. Here an optical amplifier 6 is interposed between the wavelength dispersion-compensating device 3 and Faraday rotator mirror 1 of the first embodiment. A fiber optic amplifier (exclusive of an isolator) such as an Erbium-doped fiber optic amplifier is suitable as the optical amplifier 6 in order to allow passage of the signal light in two directions. Since the fiber optic amplifier is of a type in ordinary use with the exception of the fact that it does not employ an isolator, the details thereof need not be described.

Figure 4:
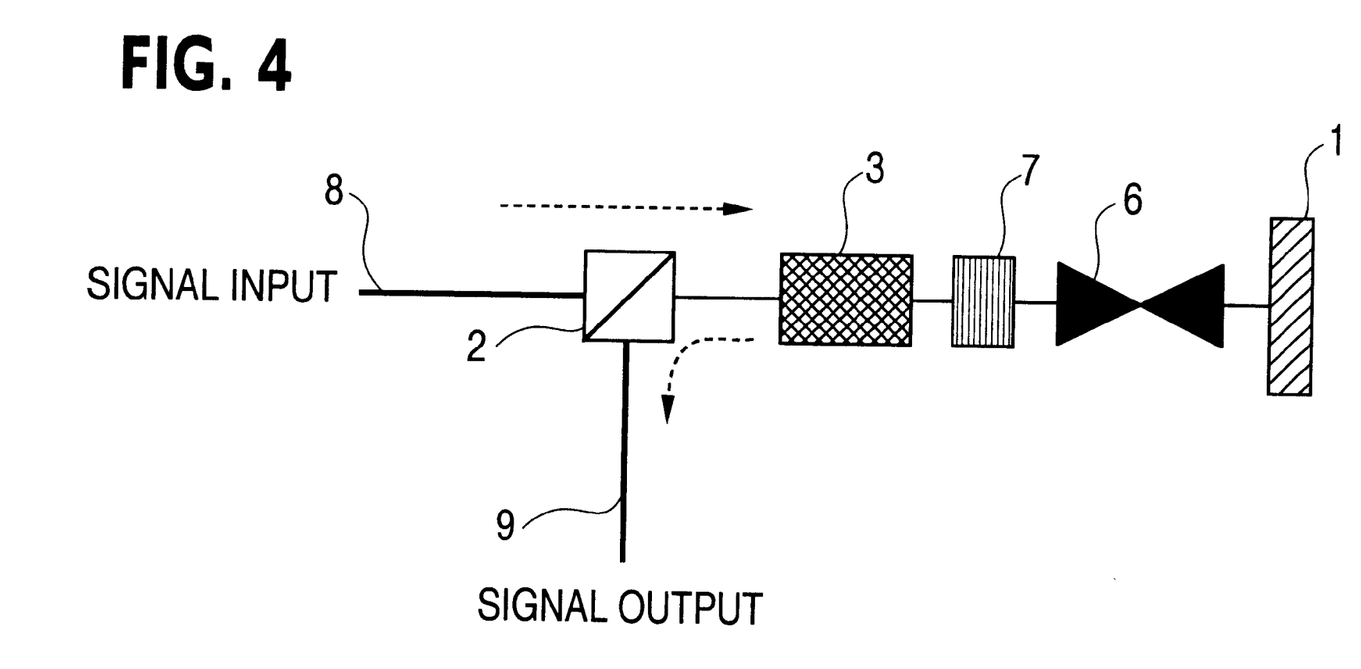

FIG. 4 is a block diagram illustrating a fourth embodiment. Here an optical fitter 7 for transmitting light of wavelength in the vicinity of the signal-light wavelength is interposed between the wavelength dispersion-compensating device 3 and optical amplifier 6 of the third embodiment. The optical fitter 7, which removes superfluous amplified spontaneous-emission light that exits from the optical amplifier 6, is provided to prevent other channels from causing a decline in optical S/N ratio after the wavelength division multiplexing is performed. If desired, the optical filter 7 may be disposed between the polarization beam splitter 2 and the wavelength dispersion-compensating device 3.

Figure 5:
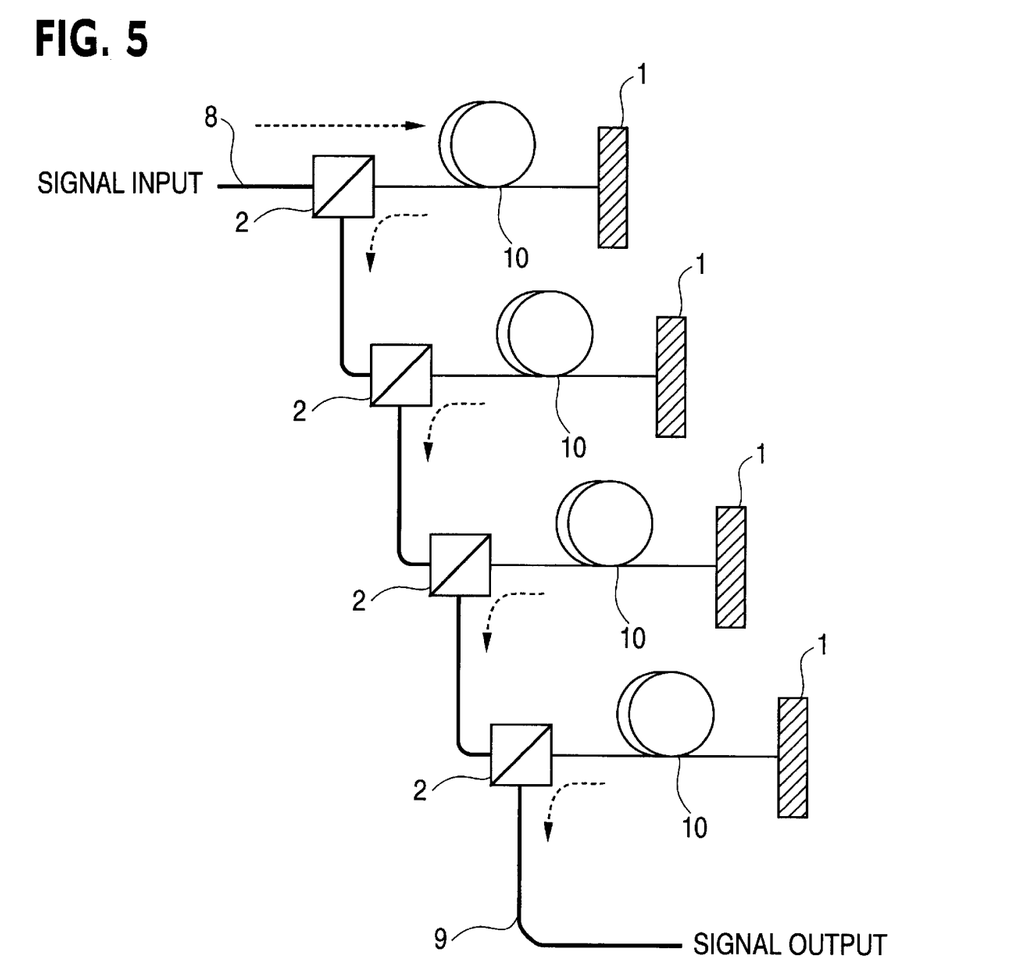

FIG. 5 is a block diagram illustrating a fifth embodiment. Here multiple stages of the polarization-maintaining dispersion compensation apparatus 100 described in the first embodiment are connected. Four stages are connected in a cascade fashion in this embodiment, which is ideal for application in cases where the amount of dispersion is large. If the dispersion-compensating device is an optical fiber, the length thereof is made such that the loss of each device will be no more than 6 dB for passage therethrough in both directions. Multiple stages are connected until the desired amount of dispersion is obtained.

Thus, in accordance with the present invention, it is possible to carry out dispersion compensation without using costly polarization-maintaining dispersion-compensating optical fiber and while maintaining the state of polarization at the input and output ends.

Incorporation herein by reference to any of the aforementioned prior art documents mentioned herein is hereby done as for the components and elements employed in the present invention. Particularly as to the faraday rotator mirror and the dispersion-compensating device, reference is made to the entire disclosure of Optical Fiber Communication Conference 99, paper TuS5, 1999.

As many apparently widely different embodiments of the present invention can be made without departing from the spirit and scope thereof, it is to be understood that the invention is not limited to the specific embodiments thereof except as defined in the appended claims.

It should be noted that other objects, features and aspects of the present invention will become apparent in the entire disclosure and that modifications may be done without departing the gist and scope of the present invention as disclosed herein and claimed as appended herewith.

Also it should be noted that any combination of the disclosed and/or claimed elements, matters and/or items may fall under the modifications aforementioned.

What is claimed is:

1. A dispersion compensation apparatus comprising:
    a first polarization-maintaining optical fiber;
    a second polarization-maintaining optical fiber;
    a polarization beam splitter having a first port to which said first polarization-maintaining optical fiber is connected, a second port to which said second polarization-maintaining optical fiber is connected, and a third port orthogonally multiplexing linearly polarized light from said first polarization-maintaining optical fiber to said second polarization-maintaining optical fiber;
    a wavelength dispersion-compensating device connected to the third port of said polarization beam splitter; and
    a Faraday rotator mirror connected to said wavelength dispersion-compensating device;
    wherein signal light is input to said first polarization-maintaining optical fiber from the first portion of said polarization beam splitter with a state of polarization of the signal light made to conform to an intrinsic polarization axis of said first polarization-maintaining optical fiber, traverses said wavelength dispersion-compensating device, is reflected by the Faraday rotator mirror, traverses said wavelength dispersion-compensating device again, returns to the third port of said polarization beam splitter and is output to said second polarization-maintaining optical fiber from the second port of said polarization beam splitter.

2. The apparatus according to claim 1, wherein said wavelength dispersion-compensating device is an optical fiber having a positive or negative dispersion value.

3. The apparatus according to claim 1, wherein an optical amplifier is interposed between said wavelength dispersion-compensating device and said Faraday rotator mirror.

4. The apparatus according to claim 3, wherein amplification factor of signal light provided by said optical amplifier is set to be equal to loss sustained when the signal light traverses said wavelength dispersion-compensating device one time.

5. The apparatus according to claim 3, wherein an optical band-pass filter for passing light having a wavelength in the vicinity of signal-light wavelength is interposed between said polarization beam splitter and said wavelength dispersion-compensating device or between said wavelength dispersion-compensating device and said optical amplifier.

6. The apparatus according to claim 2, wherein the dispersion compensation apparatus is connected in multiple stages.

7. The apparatus according to claim 6, wherein loss in dispersion-compensating fiber contained in each stage of multiple connected stages of the dispersion compensation apparatus is held to about 6 dB in both directions.

8. A process for dispersion compensation comprising:
  (a) providing a dispersion compensation apparatus comprising:
    (a1) a first polarization-maintaining optical fiber;
    (a2) a second polarization-maintaining optical fiber;
    (a3) a polarization beam splitter having a first port to which said first polarization-maintaining optical fiber is connected, a second port to which said second polarization-maintaining optical fiber is connected, and a third port orthogonally multiplexing linearly polarized light from said first polarization-maintaining optical fiber to said second polarization-maintaining optical fiber;
    (a4) a wavelength dispersion-compensating device connected to the third port of said polarization beam splitter; and
    (a5) a Faraday rotator mirror connected to said wavelength dispersion-compensating device;
  (b) inputting signal light to said first polarization-maintaining optical fiber from the first portion of said polarization beam splitter with a state of polarization of the signal light made to conform to an intrinsic polarization axis of said first polarization-maintaining optical fiber,
  (c) allowing the signal light to traverse said wavelength dispersion-compensating device,
  (d) reflecting the light by the Faraday rotator mirror,
  (e) allowing the light to traverse said wavelength dispersion-compensating device again,
  (f) returning the light to the third port of said polarization beam splitter, and
  (g) outputting the light to said second polarization-maintaining optical fiber from the second port of said polarization beam splitter.

9. The process according to claim 8, wherein said wavelength dispersion-compensating device is an optical fiber having a positive or negative dispersion value.

10. The process according to claim 8, wherein the light is passed through an optical amplifier interposed between said wavelength dispersion-compensating device and said Faraday rotator mirror.

11. The process according to claim 10, wherein amplification factor of signal light provided by said optical amplifier is set to be equal to loss sustained when the signal light traverses said wavelength dispersion-compensating device one time.

12. The process according to claim 10, wherein a light having a wavelength in the vicinity of signal-light wavelength is passed through an optical band-pass filter interposed between said polarization beam splitter and said wavelength dispersion-compensating device or between said wavelength dispersion-compensating device and said optical amplifier.

13. The process according to claim 2, wherein the light is passed through the dispersion compensation apparatus repeatedly in a multiple cascade fashion.

14. The process according to claim 13, wherein loss during traversing a dispersion-compensating fiber contained in each stage of multiple connected cascade stages of the dispersion compensation apparatus is held to about 6 dB in both directions.

* * * * *